Feb. 5, 1929.  
W. J. SMITH  
SLIDE VALVE  
Filed May 23, 1923  
1,700,956  
2 Sheets-Sheet 1

Feb. 5, 1929.　　　　　　　　1,700,956
W. J. SMITH
SLIDE VALVE
Filed May 23, 1923　　　2 Sheets-Sheet 2
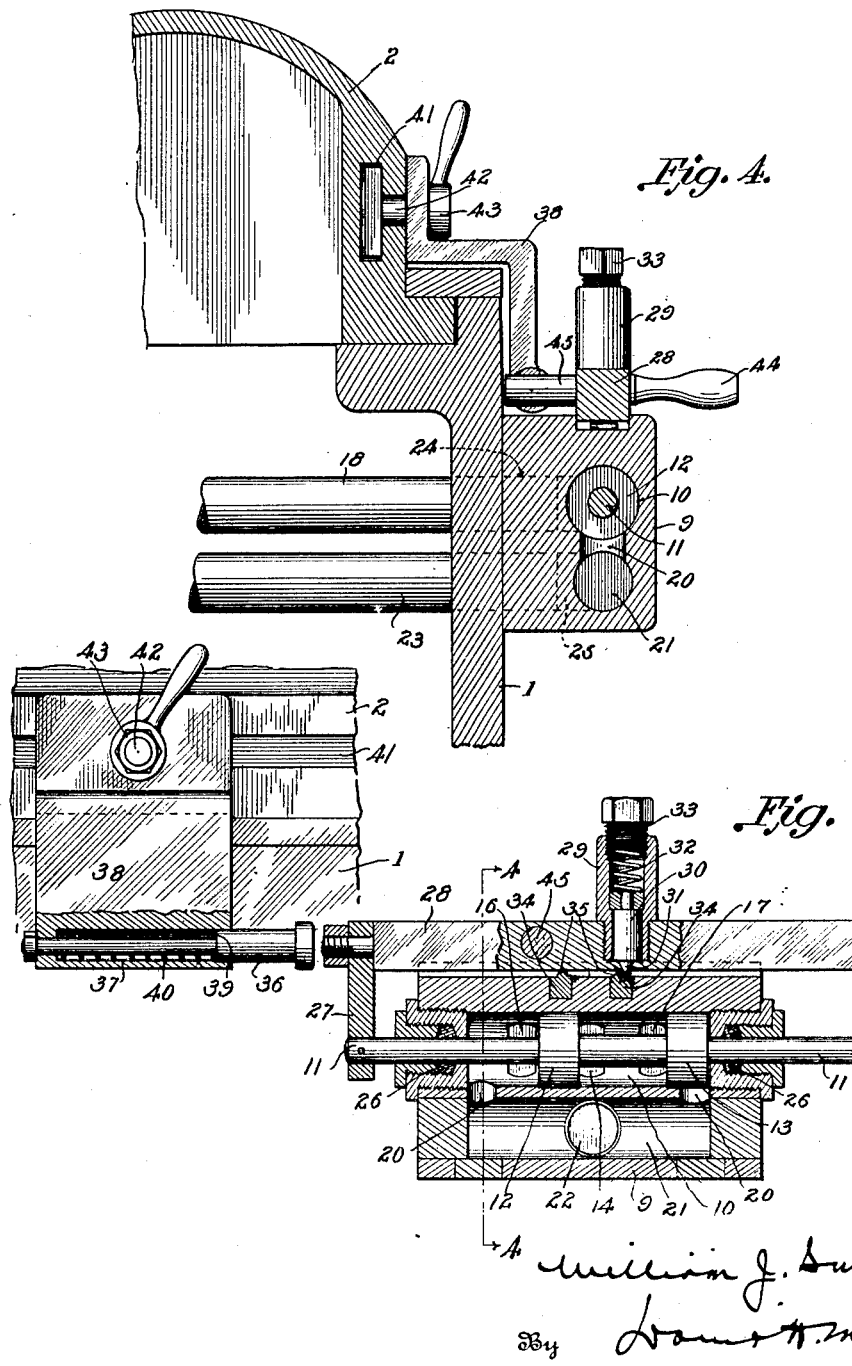

Patented Feb. 5, 1929.

1,700,956

UNITED STATES PATENT OFFICE.

WILLIAM J. SMITH, OF PHILADELPHIA, PENNSYLVANIA, ASSIGNOR TO VINCENT S. CLYMER, OF SOUDERTON, PENNSYLVANIA.

SLIDE VALVE.

Application filed May 23, 1923. Serial No. 640,847.

This invention relates to slide valves.

The object of my invention is to provide a slide valve, and means for controlling it, of such construction as particularly to adapt the valve for automatically governing a fluid under pressure supplied to the valve and utilized for effecting the reciprocation, for instance, of the tool slide of a shaper or other part of a machine tool. Further, the object of the invention is to provide a valve of the kind described, and means for controlling it, whereby a fluid under pressure may be governed to automatically impart a reciprocatory movement, for instance, to the tool slide of a shaper or other part of a machine tool, and whereby the length of the movement so imparted may be varied at will.

Having the above objects in view, the invention consists in the valve, and means for controlling it, having the novel generic and specific features of construction and arrangement of the parts, substantially as hereinafter described and claimed.

The valve is herein shown and described as applied to a shaper for controlling oil continuously supplied under pressure for effecting the reciprocation of the tool slide of the shaper, but it will be clear from an understanding of the invention that the device is capable of advantageous use in connection with any fluid under pressure which is utilized for imparting a reciprocatory movement to a part of a machine or to any other object.

The hereinafter described embodiment of the invention is illustrated in the accompanying drawing, in which:

Figure 3 is a longitudinal vertical sectional view of the valve, also showing, partly in section, one of the adjustable stops for contacting with and operating the valve; and Figure 4 is a vertical cross sectional view of the valve on the line 4—4 of Figure 3.

Figure 1:
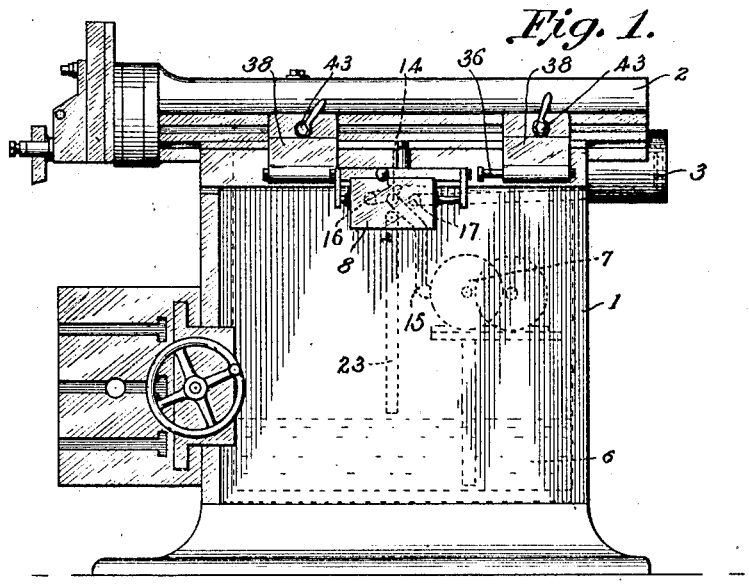
Figure 1 is a side elevation of a shaper, the valve being shown in position on the side of the casing of the tool, and the means for controlling the valve being shown attached to the tool slide.
Figure 2:
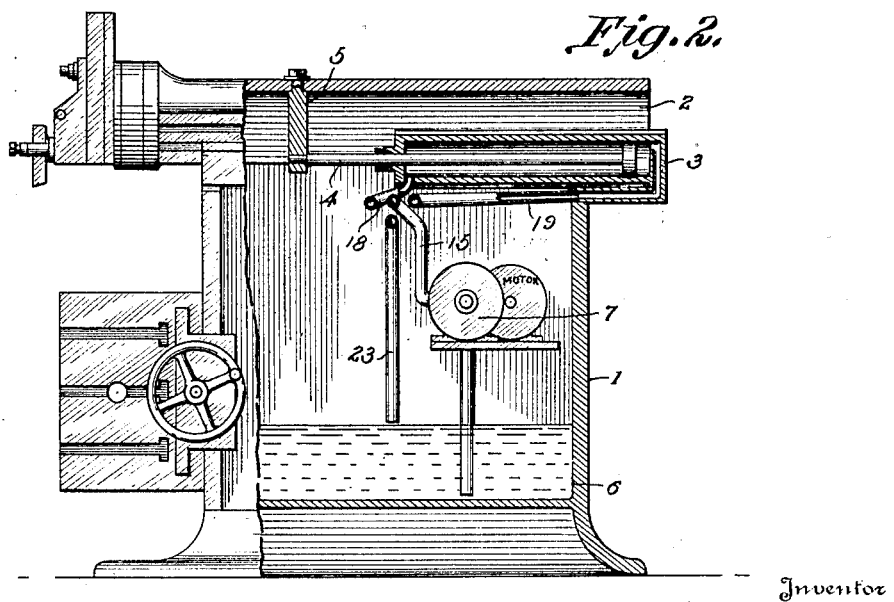
Figure 2 is a view similar to Figure 1, the side of the shaper being broken away to disclose the interior disposition of the inclosed parts.

In the drawing 1 represents the frame of a shaper, and 2 represents the tool slide arranged in the usual way at the upper part of the frame. The means employed for imparting a reciprocatory movement to the tool slide consists of a cylinder 3 having a piston rod 4 thereof connected to a projection 5 depending from the lower face of the tool slide. Motion is given the piston by alternately introducing and discharging a fluid under pressure into and from the respective ends of the cylinder. In the construction herein shown one or more of the cylinders 3 are arranged in the casing of the tool below the tool slide, and oil contained in a tank 6 in the lower part of the casing is drawn from the tank by a pump 7 and forced through a valve 8 to the cylinder or cylinders 3 to actuate their pistons.

In the construction shown it is contemplated to operate the pump continuously during the use of the tool, and the operation of the valve 8 by reason of its construction and of the connections with the associated parts is to direct the oil alternately to the ends of the cylinders, and alternately effect the discharge of the oil from the ends of the cylinder and conduct it back to the tank from which it is drawn by the pump.

The construction of the valve and of the means for controlling it are shown particularly in Figures 3 and 4 of the drawing. The principal operative parts of the valve are inclosed in or mounted on case 9 which is attached to the casing of the shaper preferably below the tool slide of the latter Extending longitudinally through the case 9 is a tubular chamber 10, in which is mounted the valve stem 11, on which are formed the two heads 12 and 13 of diameters corresponding to that of the chamber 10 In the form of valve herein shown one face of the case 9 is provided with an inlet port 14 which is connected by a pipe 15 to the discharge of the pump, and with ports 16 and 17. The port 16 is connected by a pipe 18 with the forward end of the cylinders employed, and the port 17 is connected with the rear ends of the cylinders by a pipe 19. The chamber 10 is connected at each end by passages 20 with a discharge chamber 21, the latter being connected in turn through the discharge port 22 and the pipe 23 with the oil tank 6.

The ports 14, 16 and 17 are, as shown in Figure 4 of the drawing, circular in their outer portions 24 and internally screw threaded to receive corresponding ends of the connecting pipes, and their inner ends are reduced, forming the narrow reduced openings 25 to be controlled by the heads of the valve.

The valve stem 11 extends from the ends of the case 9 through glands 26 and is connected at each end by a rod 27 with a bar 28 adapted to slide on the top of the case. Arranged in a socket 29 in the bar 28 is a plunger 30 having a reduced lower end 31. Bearing upon the upper end of the plunger 30 is a coil spring 32 the tension of which is governed by a screw plug 33 bearing on the spring and retained adjustably in socket 29.

The upper face of the case 9 has extending from it and disposed below the plunger in positions to be contacted with by the reduced end of the plunger two projections 34. The inner portions of the projections incline gradually upward to points 35 and from these points the faces of the projections decline abruptly.

Movement of the valve stem is accomplished through spring abuments 36 secured to the tool slide of the planer one on each side of the valve and so disposed as to contact with a portion of the sliding bar 28. The spring abutments are mounted in openings 37 in the hangers 38. Surrounding each abutment 36, and bearing at one end on a shoulder 39 on the abutment and at the other end against the end of the opening 37, is a coil spring 40 which when the abutment is brought into contact with the bar 28 is placed under compression.

The hangers are attached to the tool slide in any suitable way to allow them to be adjusted longitudinally of the slide. As herein shown, the side of the slide has formed with it a dovetail groove 41 in which is located the headed screw bolt 42 of a hanger. The screw bolt passes through the upper portion of the hanger and has on it the jam nut 43 which bears against the outer face of the hanger.

In order to furnish means whereby the valve may be operated by hand, and also to furnish a projection to be contacted with by the spring abutments carried by the tool slide, to automatically operate the valve, the sliding bar is provided with the handle 44 having the shank 45. The handle projects at the front of the valve in convenient position for grasping, and the shank projects rearward into the paths of movements of the spring abutments.

In the operation of the device as described the pump 7 continuously draws oil from the tank and delivers it under pressure to the valve, where it is received through the inlet port 14 of the valve. Assuming that the valve is in the position shown in Figure 3 of the drawing, a communication is established through the inlet port 14, the port 17 and the rear ends of the cylinders 3. The introduction of the oil under pressure at the rear ends of the cylinder moves their piston forward and, by reason of the connection between the piston and the tool slide, the latter is also moved forward. Inasmuch as when the valve is in the position referred to, a connection is established between the forward ends of the cylinders through the pipe 18, port 16 of the valve, passage 20, discharge port 22 and pipe 23 extending to the tank, any oil contained in the forward parts of the cylinder, instead of offering an impediment to the movements of the piston, is forced from the cylinder and ultimately delivered to the tank. The forward movements of the parts continue until, by reason of the contact of the rearward spring abutment with the shank 45, the valve is shifted from its initial position to the opposite one which will establish a connection between the pump and the forward ends of the cylinders, and between the rear ends of the cylinders and the tank, resulting in a rearward movement of the slide. When in this rearward movement the forward spring abutment contacts with the projection 45 the valve is shifted to the position first referred to and the movement of the slide is again reversed. Thus by the shifting of the valve as described the connections between the cylinders and the valve become alternately inlets for the oil under pressure to actuate the piston and discharges for allowing the escape of the oil utilized in effecting the previous movement, and a continuous automatic reciprocation of the tool slide is effected.

When, near the end of the movement of the reciprocatory portion of the machine, the spring of an abutment has been compressed by reason of the contact of the abutment with the projection 45, and the end of the plunger 30 passes over the point 35 of the projection 34, and the resistance to the action of the abutment spring is removed, the spring acts to shift the valve to an opposite position. The throw of the valve is also assisted and insured at the times referred to by the action of the plunger 30. The projections 34 are so disposed that the plunger moves over the gradually inclined inner faces of the projections and is raised, compressing the spring 32 as the valve is moved toward the end of a stroke. Immediately before the end of a stroke of the valve is reached the end of the plunger passes over the point 35 of one of the projections, and by the action of the spring, previously compressed, is forced downward over the abruptly inclined side of the projection, imparting a limited movement to the valve sufficient to make certain, in conjunction with the action of the spring abutment heretofore described, the completion of the movement of the valve.

The valve may at any time and under all conditions be manually operated by means of the handle 44, either entirely to cut off the supply of oil, by bringing the valve to the neutral position shown by full lines in Figure 3, or to start the operation of the device by moving the valve to admit the oil to one or the other end of the cylinders, as may be required.

The length of movement imparted to the tool slide in either direction may be varied and governed at will by moving the hangers longitudinally of the tool slide, and by securing them in place by the jam nuts provided for the purpose, in order to effect the shifting of the valve and cause a reversal of the movement of the slide on the completion of a movement of the slide of any desired length.

I claim:

1. A valve of the kind described comprising a slidable valve stem, a spring-held plunger connected to the stem, stationary projections having inclined faces arranged in the path of movement of the plunger, and with which the plunger alternately contacts, a reciprocatory member, a projection connected to the valve stem, and spring-held abutments on the reciprocatory member adapted to contact with the projection.

2. A valve of the kind described comprising a slidable valve stem, a spring-held plunger connected to the stem, projections spaced apart and each having oppositely arranged gradually and abruptly inclined faces and disposed in the path of movement of the plunger, a reciprocatory member, a projection connected to the valve stem, and spring-held abutments on the reciprocatory member adapted to contact with the projection.

3. A valve of the kind described comprising a casing, a slidable valve arranged in the casing and having its stem projecting from the casing, a bar connected to the ends of the valve stem, a spring-held plunger carried by the bar, inclined projections on the casing adapted to be contacted with by the plunger, a reciprocatory member, and spring-held abutments on the reciprocatory member adapted to contact with the bar.

In testimony whereof I affix my signature.

WILLIAM J. SMITH.